Patented Dec. 26, 1944

2,366,027

UNITED STATES PATENT OFFICE 2,366,027

DETERGENT AND WETTING COMPOSITIONS

Clyde O. Henke, Wilmington, Del., assignor to E. I. du Pont de Nemours & Company, Wilmington, Del., a corporation of Delaware No Drawing. Application April 1, 1942, Serial No. 437,277

5 Claims. (Cl. 252—161)

This invention relates to surface active compositions comprising purified aliphatic and/or cycloaliphatic sulfonic acids or their salts. More particularly it relates to surface active compositions comprising a mixture of saturated hydrocarbon sodium sulfonates containing from 12 to 20 carbon atoms, a lower aliphatic alcohol, a higher aliphatic alcohol, and a water-soluble alkali metal salt. The invention also relates to the preparation and use of such compositions.

This application is a continuation-in-part of copending application, Serial No. 352,797, filed August 15, 1940 (and issued December 28, 1943, as Patent No. 2,337,552), which application is directed to the preparation and purification of the surface active compounds used in the novel compositions of this invention.

When a saturated hydrocarbon or a mixture of such hydrocarbons is reacted with a mixture of sulfur dioxide and chlorine at a temperature below the decomposition point of the formed organic sulfonyl chlorides under the influence of actinic light in the above-identified manner, a rather complex mixture of products is formed which contains hydrocarbon monosulfonyl chlorides, chlorhydrocarbon monosulfonyl chlorides, chlor-hydrocarbon polysulfonyl chlorides, hydrocarbon polysulfonyl chlorides, chloro-hydrocarbons and unreacted hydrocarbons. Similar results are obtained with hydrocarbon derivatives. The proportion of products in the mixture can be varied somewhat by varying the proportions of sulfur dioxide to chlorine, the rate of flow, the intensity of the actinic light used to accelerate the reaction, pressure, and temperature conditions. If a large proportion of hydrocarbon is present or only a portion of the available hydrocarbon is reacted a large proportion of hydrocarbon monosulfonyl chlorides is formed. Some substitution, however, takes place whereby chlorhydrocarbon monosulfonyl chlorides are formed.

In the case where the saturated open chain hydrocarbons and derivatives thereof, e. g. nongaseous n-alkanes, isoalkanes, chloroalkanes and mineral oil fractions free from aromatic and unsaturated constituents are used as initial reactants, the mixtures are usually complex since the sulfonyl chloride groups do not enter the same position in each molecule. Hence, the resulting alkali metal salts are quite complex when the entire fraction or a portion thereof which consists essentially of hydrocarbon sulfonyl chlorides is used for the hydrolysis and neutralization of such chlorides.

An object of this invention is to provide new surface active compositions. A further object is to provide such compositions having improved deterging and wetting-out properties. Another object is to provide such compositions having improved sudsing properties. A further object is to provide compositions having good sudsing and deterging properties containing surface active agents obtained from purified mixtures of higher aliphatic and/or cycloaliphatic sulfonyl halides, especially chlorides. Another object is to prepare such compositions by utilizing economical and readily available materials and apparatus. Still other objects will be apparent from a consideration of the hereinafter described invention.

The above objects are accomplished by removing the unsulfonated hydrocarbon, particularly liquid hydrocarbon or oil from an aqueous mixture of water-soluble higher aliphatic or cycloaliphatic sulfonates from crude reaction mixtures by a liquid phase extraction with a high boiling hydrocarbon compound, admixing the surface active compounds in the aqueous portion with from 1% to 15% by weight of a water immiscible or insoluble alcohol and 1% to 20% of a water miscible or soluble alcohol.

In one important aspect the invention involves removing the unsulfonated hydrocarbon, particularly liquid hydrocarbon or oil from an aqueous solution of water-soluble higher aliphatic or cycloaliphatic sulfonates obtained by a conversion of the corresponding sulfonyl halides by a liquid phase extraction with a high boiling hydrocarbon. The surface active compounds in the aqueous phase are admixed with the above-described amounts of a water-immiscible alcohol and a water-miscible alcohol.

In a practical embodiment a high boiling liquid or normally solid hydrocarbon or a derivative thereof is used as the extracting agent. The extraction is carried out in the liquid state. The bulk of the hydrocarbon material is removed while in the molten state, the aqueous layer is then cooled and the hydrocarbon portion which settles out is removed and the filtrate is concentrated. The surface active compounds are admixed with a water-immiscible and water-miscible alcohol in the above amounts.

The compositions may in addition to said alcohols contain from 25% to 75% of water. All amounts are by weight and based upon the surface active compounds.

The invention may be used with a wide variety of sulfonates as will be described hereinafter. It is particularly adapted to the use of the surface active compounds obtained by the purification and separation of sulfonates containing an aliphatic hydrocarbon nuclei of at least 5 carbon atoms or a cycloaliphatic hydrocarbon nuclei of at least 6 hydrocarbons from mixtures containing hydrocarbons or hydrocarbon derivatives containing nuclei of the same number of carbon atoms in compositions of the above-described character.

The invention is further illustrated but is not intended to be limited by the following examples wherein the parts stated are by weight.

Example I

The sodium salts of hexadecane sulfonic acids are prepared by passing a gaseous mixture of 89 parts of sulfur dioxide and 70 parts of chlorine into 300 parts of hexadecane over a period of 30 minutes. The reaction flask is illuminated with a 150 watt tungsten lamp. The reaction mass gains 90 parts by weight. The so formed hexadecane sulfonyl chlorides mixed with hexadecane and containing some chloro derivatives of each are hydrolyzed to the corresponding hexadecane sodium sulfonates by hydrolyzing with 240 parts of hot 30% sodium hydroxide. To the resulting product are added 300 parts of molten refined paraffin wax, having a melting point of 50° C. (122° F.), 1300 parts of water, and 101 parts of ethyl alcohol. The mixture is heated and stirred and let stand. The molten paraffin and unsulfonated oils separate as a top layer. The lower aqueous layer, which is 1512 parts by weight shows on analysis a hexadecane sodium sulfonate content of 11.0% and an unsulfonated oil content of 0.37%. A wetting test by the Draves-Clarkson skein sinking method shows sinking in 25 seconds at 77° F. at a concentration of 0.68 g. hexadecane sodium sulfonate per liter.

Naphthalene may be substituted for the paraffin wax with similar results.

Example II

A crude aqueous solution of the hexadecane sodium sulfonates prepared as in Example I of 692 parts by weight is diluted with 1284 parts of water and 100 parts of ethyl alcohol and heated to 60° C. On standing the major portion of the unreacted hexadecane separates as a top layer. The lower aqueous layer is withdrawn and stirred with 300 parts of paraffin at 70-80° C. for one hour. The mixture is poured into a separatory funnel and the major proportion of the paraffin separates as a molten upper layer. The lower aqueous layer is withdrawn and cooled. Solid paraffin crystallizes out from the aqueous solution and is filtered off at 22° C. The aqueous filtrate analyzes 12.6% hexadecane sodium sulfonate and 0.37% unsulfonated oil. The product has wetting properties similar to that of Example I.

Example III

A Pennsylvania base mineral oil is purified by suitable means so that it is substantially free from aromatic and olefinic constituents and has the following characteristics: A distillation range of 267° C. to 310° C.; a Saybolt Universal viscosity at 100° F. of 37 seconds; a refractive index at 20° C. of 1.444; a specific gravity at 15.5° C. compared to water at 15.5° C. of 0.804. This oil is treated with a gaseous mixture of sulfur dioxide and chlorine in a molar ratio of 1.4 to 1.0 at about 30° C. in the presence of light having a radiation range of 4000 A to 5800 A until the specific gravity at 30° is 0.940. The resulting aliphatic sulfonyl chloride contaminated with unsulfonated oil and some chloro derivatives is hydrolyzed to the corresponding sodium sulfonate with hot 30% sodium hydroxide. The crude mass is diluted with twice its weight of water and eight one-hundredths of its weight of ethyl alcohol, heated to 60-65° C., and allowed to stand. The major portion of unsulfonated oil separates as a top layer. The lower aqueous layer is withdrawn and analyzes 12.3% aliphatic sodium sulfonate and 1.02% unsulfonated oil.

Fifteen hundred parts of this solution is stirred with 75 parts of paraffin wax melting at 130° F. (54° C.) and 75 parts of isopropyl alcohol at 60-65° C. for 30 minutes. The mixture is cooled slowly to 17° C. A solid cake of wax separates on top and is removed. The remaining crystallized wax is filtered off. The resulting filtrate analyzes 12.5% aliphatic sodium sulfonate and 0.23% unsulfonated oils.

Eleven hundred and eighty-eight parts of the filtrate is heated to 95° C. with 290 parts of sodium chloride and 63 parts of water. The mixture is poured into a separatory funnel. A separation into layers takes place quickly, a concentrated sodium chloride solution forming the lower layer and a concentrated aliphatic sodium sulfonate solution forming the upper layer. The lower layer is drawn off and discarded. The upper layer of concentrate is 443 parts by weight. To the upper layer is added 22 parts by weight of isopropyl alcohol and the mixture is heated to 70°. A further separation of sodium chloride solution and sodium chloride occurs as a lower layer which is drawn off. The upper layer of 384 parts by weight is diluted with 34 parts of water to give a clear stable solution. This solution analyzes 31.7% aliphatic sodium sulfonates and a wetting test shows that 2.1 g. of the solution per liter gives sinking in 25 seconds by the Draves-Clarkson skein-sinking method. To 200 parts of the above solution are added 4 parts of n-octyl alcohol to form a clear solution. This product when tested for wetting efficiency as above shows sinking in 25 seconds at a concentration of 1.8 g. per liter.

Naphthalene may be substituted for the paraffin wax with similar results.

Example IV

Fifteen hundred parts of a sodium alkyl sulfonate solution analyzing 10.3% active ingredient prepared as in the first paragraph of Example III was mixed with 146 parts of borneol terpenes, 30 parts of isopropyl alcohol and 370 parts of sodium chloride. The mixture was heated to 85-90° and poured into a separatory funnel. The mixture separated into layers rapidly. The lower layer which was a concentrated salt solution was withdrawn and discarded. The upper layer which was a concentrated solution of sodium alkyl sulfonate and terpenes weighed 433 parts by weight. To this was added 18 parts of water and a clear solution was obtained. The product gave wetting by the Draves-Clarkson skein-sinking method of 1.89 g. per liter at 25° C. The product likewise has excellent sudsing and detergent properties. If desired, the solution of sodium alkyl sulfonates may be extracted with paraffin before the salting out step as disclosed in Example III.

Example V

A gaseous mixture of 902 parts by weight of sulfur dioxide and 297 parts by weight of chlorine were passed at a uniform rate for four hours through 200 parts by weight of menthane contained in a flask which was illuminated by a 60-watt incandescent light. Heat was evolved during the reaction. The temperature was maintained at 40° C. by means of a water bath. At the end of four hours the menthane had gained 201 parts by weight. The product formed at this stage apparently contained menthane sulfonyl chlorides, chlormenthane sulfonyl chlorides and small amounts of chlormenthane. The reaction product was then added to 500 parts of 30% sodium hydroxide solution. The temperature during neutralization was maintained at 90° to 95° C. About 883 parts of product were obtained. The product was diluted with 237 parts of water. An insoluble oil layer separated and was removed.

To 900 parts of the solution so obtained were added 75 parts of a paraffin wax melting at 50° C. and the mixture was heated to 65° C. and stirred for 30 minutes. The mixture was poured into a separatory funnel and allowed to stand whereupon a layer of molten paraffin separated at the top. The lower aqueous layer was withdrawn and cooled to 20° C. Solid paraffin precipitated out. This was removed by filtration and clear pale yellow aqueous solution was obtained. This solution showed high wetting power when dissolved in 52° Tw. caustic soda solution.

The extraction procedure may be modified in a number of ways without departing from the scope of the invention. Thus, the extraction of the unsulfonated oil may be made at any convenient temperature from the melting point of the hydrocarbon or derivative or lower to the boiling point of the solution. Various water miscible agents such as methyl, ethyl, propyl and isopropyl alcohols, acetone, etc. may be added to the solution to lower the amount of paraffin wax emulsified in the solution if desired.

The temperature to which the solution may be cooled before filtering off the separated or crystallized hydrocarbon or derivative may be varied but in general a temperature is selected slightly above that at which the aliphatic sulfonates would tend to separate with the hydrocarbon or derivative. The extraction is generally carried out at atmospheric pressure; however, higher pressures may be resorted to if desired.

While each of the working examples is directed to the use of paraffin wax and more particularly to the lower melting paraffin waxes, the extraction procedure is not limited to the use of this narrow class of materials. Various other types of paraffin waxes and petroleum hydrocarbon waxes in general may be substituted with similar results. Suitable other waxes include match wax, scale wax, hard and soft paraffin wax, higher melting paraffin waxes, micro-crystalline paraffin waxes, petrolatum waxes, mixtures of any or all of the above, etc.

Nor is the extraction feature limited to the use of hydrocarbon waxes for any hydrocarbon or relatively inert derivative which is solid at about room temperature, i. e. 20° C. and which melts at a more elevated temperature, preferably between 30 and 80° C. and which is capable of forming a solution with the unsulfonated oil. Suitable additional materials include hexachloro ethane, aromatic hydrocarbons, e. g. naphthalene, methyl anthracene, octadecylbenzene, tetramethyl benzene, acenaphthene, etc., substituted aromatic hydrocarbons such as p-dichlorobenzene, tetrachlorobenzene, 2-chloronaphthalene, dichloronaphthalene, etc., alkanes, e. g., eicosane, heneicosane, tricosane, hentriacontane, pentatriacontane and hexacontane, etc., and their halogen derivatives; the normally solid high molecular weight monohydric alcohols, e. g. dodecyl, tetradecyl, hexadecyl and octadecyl and their fatty acid esters, e. g. the acetates, propionates, butyrates, stearates, palmitates, etc. Mixtures of each of the above may also be used.

The water-soluble sulfonates treated are not limited to the sodium sulfonates set forth in the preceding examples. On the contrary, a wide variety of other water-soluble sulfonates may be purified. In addition to alkali metal salts, including lithium, sodium, potassium, ammonium, calcium, magnesium and other salts, the corresponding free acids may be similarly purified.

While the preferred extracting agents are normally solid at room temperature, it is possible to use the higher molecular weight petroleum oils such as refined lubricating oils of an average molecular weight of at least 16 carbon atoms. The normally solid alkanes and paraffin waxes and mixtures thereof have a number of distinct advantages in that they are readily available commercially, low in cost and their use does not introduce any deleterious material into the final product.

The salting out step may be practiced at various temperatures from room temperature to the boiling point of the solution. In general, the higher the temperature the higher is the concentration of the aliphatic sulfonate solution obtained. A great many electrolytes other than those listed in the specific examples may be substituted therefor or used in conjunction with any of the materials disclosed herein with similar results. The types of electrolytes useful are exceedingly diverse in character. Representative materials include alkali metal, especially sodium and potassium and ammonium hydroxides, halides, carbonates, nitrates, borates, phosphates, sulfates, formates, acetates, malates, citrates, tartrates and benzoates. Specific salts falling within certain of the above categories include sodium and potassium chloride, bromide, iodide, metaborate, phosphate (mono- and di- and tri-basic), sulfate, ammonium chloride, zinc chloride, sulfuric acids, hydrochloric acid, etc. In general, electrolyte solutions containing at least 20% weight are effective, however, lower concentrations can be used. The particular concentration to be used depends on the particular sulfonate treated and the electrolyte chosen.

Various additive agents may be used in the standardizing of the concentrated solution of aliphatic sulfonate. These agents may or may not confer added wetting properties to the product. Thus, monohydric water-miscible alcohols such as methyl, ethyl, propyl, butyl, and their isomers, di- and polyhydric alcohols such as ethylene glycol, propylene glycol, glycerol, sorbitol, sugars, etc. may be added. Other compounds of such diversified nature as urea, ethanolamines, casein, the higher alkyl sodium sulfates, water-immiscible alcohols such as octyl, decyl, hexyl, and dodecyl, or "Lorol" which is a mixture of higher molecular weight alcohols, terpineol, pine oil, terpenes, terpene alcohols, ammonium sulfamate, polyvinyl alcohols, etc. may be used to confer various properties on the standardized product.

The aliphatic and cycloaliphatic sulfonate mixtures purified are not limited to those set forth in the specific examples. On the contrary, any of the sulfonates obtained by conversion of normally liquid to solid aliphatic or cycloaliphatic hydrocarbons into sulfonyl chlorides and hydrolysis and neutralization may be substituted and processed in a similar manner. Suitable sulfonates are disclosed in U. S. Patents 2,174,505, 2,174,506, 2,174,507, 2,174,508, 2,174,509, 2,197,800, and 2,263,312. The sulfonates which may be purified are not limited to those obtained from a reaction with admixed sulfur dioxide and a halogen or sulfuryl halides and subsequent hydrolysis and neutralization as described above, but may be applied to the sulfonate products obtained by chlorinating higher alkanes, mineral oils, etc., then reacting the resulting chlorinated products with thiourea to give the isothiourea derivative, oxidizing the resulting products with chlorine water and hydrolyzing and/or neutralizing the resulting sulfonyl chlorides. The last-mentioned processes are set forth in U. S. Patents 2,142,934, 2,146,744, 2,147,346, and 2,174,856.

Furthermore, solutions of sulfonates obtained in other ways such as the oxidation of sulfides or mercaptans, the action of sulfites on halogenated hydrocarbons, the sulfonation of hydrocarbons or their derivatives with sulfonating agents may be purified by this method.

The water-soluble compositions produced according to this invention have considerable surface-activity and other valuable properties, and may be used as mercerizing assistants, corrosion inhibitors, gum solvents for gasoline, extractants for the refining of gasoline, pour point depressants, insecticides, fly spray ingredients, weed killers, soil fumigants, cotton immunization chemicals, anti-shrinking agents for wool, foaming agents, mold inhibitors, lubricants for steel drawing and metal working, crease-proofing agents, viscose modifiers, pharmaceuticals, detergents, wetting agents, rewetting agents, for improving textile treating processes, including wool scouring, carbonizing, fulling, sizing, desizing, bleaching, mordanting, lime soap dispersing, improvement of absorption, delustering, degumming, kier-boiling, felting, oiling, lubricating, resisting cotton in an acid bath, dyeing, printing, stripping, creping, scouring viscose rayon, etc. They may also be useful in improving dye compositions, printing paste, the preparation of lakes, the preparation of inorganic pigments and household dye preparations. They may also be useful in improving processes of dyeing leather and textiles including dyeing with developed dyes, dyeing in neutral, acid or alkaline dye baths, dyeing of animal fibers with vat dyes, etc.

They may also be useful in treating oil wells and to improve flooding oil bearing sands. They may also be used to improve radiator cleaning compositions, cleansing compositions as household detergent compositions, shampoos, dentifrices, washing of paper mill felts, etc. They may also be used to improve fat liquoring and leather treatment processes as well as for fat splitting agents. They may also be useful in improving the preservation of green fodder. They may also be useful in improving the removal of fibrous layers from surfaces and in metal cleaning. They may also be used to improve flotation processes of ores, pigments, coal, etc. They may also be useful in breaking petroleum emulsions or in different concentrations as emulsifying agents. They may also be useful in improving food preparations. They may be useful in improving the cooking of wood pulp. They may also be useful in providing improved ceramic assistants and processes to improve the setting of cement. They may also be useful in storage batteries and dry cells. Other uses for these products or their derivatives are as fungicides, accelerators, delusterants, extreme pressure lubricants, moth proofing agents, antiseptics, fire-proofing agents, mildew preventers, penetrating agents, anti-flexing agents, tanning agents, lathering agents, dust collecting agents, antioxidants, color stabilizers in gasoline, etc.

The surface activity of some of the herein described compositions may be modified or in some cases enhanced by the addition of other surface-active agents, e. g. alkylated naphthalene sulfonic acids and their water-soluble salts, salts of higher alkyl sulfuric acid esters as described in Bertsch Patents Nos. 1,968,794 to 1,968,797, long chain betaine derivatives both of the C— and N— and open type which are illustrated by Daimler et al. Patent No. 2,082,275, Balle et al. 2,087,565, Platz et al. Patent No. 2,097,864 and Balle et al. 2,101,524, long chain ammonium, sulfonium and phosphonium compounds, as well as numerous other soap substitutes.

The invention has particular utility in purifying the sodium and potassium sulfonates obtained from the alkane mono- and poly-sulfonyl chlorides and chloroalkane mono- and poly-sulfonyl chlorides having at least 12 carbon atoms from mixtures containing them and normally liquid or solid hydrocarbons. The surface activity, deterging and wetting properties of these products are enhanced quite materially. Furthermore, the surface activity per unit of weight is substantially increased by virtue of the increased concentration of the product.

The process of extraction of the unsulfonated oil from the aliphatic sodium sulfonate solutions is a very appreciable improvement over the ordinary methods of extraction with volatile solvents. When solvents such as petroleum ether, carbon tetrachloride, benzene, ether trichlorethylene, etc. are used, very stable emulsions are formed. The emulsion may be so permanent that a clear solution of the solvent in the aliphatic sulfonate solution is formed. It is difficult to break these emulsions. When the solution is heated to drive off the emulsified solvent, the unreacted oil dissolved by the solvent is left in solution. However, when paraffin wax, for example, is used as the solvent, the solubility in the aqueous aliphatic sulfonate is more limited. Further, when the solution is cooled so that the small amount of emulsified paraffin will crystallize, the unreacted oil stays in the solid paraffin rather than in the solution and is filtered off.

The salting out step of the process is advantageous in that it permits an easy way to obtain concentrated solutions. Otherwise it would be necessary to evaporate the water from the solution. This evaporation is accompanied by excessive foaming and some darkening of color of the solution.

As many apparently widely different embodiments of this invention may be made without departing from the spirit and scope thereof, it is to be understood that I do not intend to limit myself to the specific embodiments herein except as defined by the appended claims.

In the claims below, the expression "non-aromatic hydrocarbon" is to be understood as a simplified generic phrase defining a hydrocarbon selected from the group consisting of aliphatic and cycloaliphatic hydrocarbons.

I claim:

1. A composition of matter having detergent and wetting properties, comprising 1 to 15% by weight of a water-immiscible alcohol, 1 to 20% by weight of a water-miscible alcohol, the said percentages being based on the weight of the sulfonate hereinafter defined, and a water-soluble saturated hydrocarbon sulfonate from the group consisting of sulfonic acids and water-soluble salts thereof, having at least 5 carbon atoms and being the residue left after extraction in the liquid phase with a hydrocarbon which is solid at 20° C. of the aqueous mass obtained by hydrolysis of a crude reaction mass comprising sulfonyl-chloride derivatives of non-aromatic hydrocarbons having at least 5 carbon atoms in admixture with unreacted hydrocarbons of the same group.

2. A composition of matter having detergent and wetting properties comprising 1 to 15% by weight of a water-immiscible alcohol, 1–20% by weight of a water-miscible alcohol, the said percentages being based on the weight of the salt hereinafter defined, and a water-soluble salt of a saturated aliphatic hydrocarbon sulfonic acid, having at least 12 carbon atoms and being the residue left after extraction in the liquid phase, with a hydrocarbon having a melting point between 30° and 80° C., of the aqueous mass obtained by hydrolyzing a crude reaction product comprising sulfonyl-chloride derivatives of a saturated aliphatic hydrocarbon having at least 12 carbon atoms in admixture with some of the unreacted hydrocarbon.

3. The composition of matter of claim 2, in which the salt is an alkali metal salt.

4. A composition of matter having detergent and wetting properties comprising 1–15% by weight of a water-immiscible alcohol, 1–20% by weight of a water-miscible alcohol, the said percentages being based on the weight of the salt mixture hereinafter defined, and a water-soluble mixture of primary and secondary alkane and chloro-alkane, mono- and polysulfonic acid alkali metal salts having at least 12 carbon atoms, and being the residue left after extraction in the liquid phase, with a hydrocarbon melting between 30° and 80° C., of the aqueous mass obtained by hydrolyzing a crude reaction mass comprising the mono- and poly-sulfonyl-chlorides corresponding to said sulfonates in admixture with some of the unreacted alkanes having at least 12 carbon atoms.

5. A composition of matter having detergent and wetting properties comprising 1–15% by weight of a water-immiscible alcohol, 1–20% by weight of a water-miscible alcohol, the said percentages being based on the weight of the salt hereinafter defined, and a water-soluble salt of a saturated aliphatic hydrocarbon sulfonic acid having at least 12 carbon atoms, and being the residue left after extraction in the liquid phase, with a petroleum hydrocarbon wax, of the aqueous mass obtained by hydrolyzing a crude reaction product comprising sulfonyl-chloride derivatives of a saturated aliphatic hydrocarbon having at least 12 carbon atoms in admixture with some of the unreacted hydrocarbon.

CLYDE O. HENKE.